(12) United States Patent
Diggs et al.

(10) Patent No.: US 7,895,992 B2
(45) Date of Patent: Mar. 1, 2011

(54) PUSH ROD ENGINE WITH INBOARD EXHAUST

(75) Inventors: Matthew Byrne Diggs, Farmington, MI (US); Michael Joseph Schrader, Canton, MI (US); Jeff Allen Mullins, Allen Park, MI (US); Jeff D Fluharty, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 654 days.

(21) Appl. No.: 11/859,833

(22) Filed: Sep. 24, 2007

(65) Prior Publication Data
US 2009/0078240 A1 Mar. 26, 2009

(51) Int. Cl.
F02B 33/00 (2006.01)
F02B 75/22 (2006.01)
F02F 7/00 (2006.01)
F02F 1/42 (2006.01)
F01L 1/34 (2006.01)
F01L 1/30 (2006.01)

(52) U.S. Cl. .............. 123/559.1; 123/195 R; 123/193.5; 123/90.16; 123/90.24

(58) Field of Classification Search .......... 123/559.1, 123/54.4, 53.6, 90.16, 90.24, 195 R, 193.5, 123/556, 90.61; 60/323–324, 605.1, 313
See application file for complete search history.

(56) References Cited

U.S. PATENT DOCUMENTS

| | | | | | |
|---|---|---|---|---|---|
| 2,036,269 A | * | 4/1936 | Good | ............... | 123/195 R |
| 2,871,842 A | * | 2/1959 | Dolza | ............... | 123/457 |
| 2,873,574 A | * | 2/1959 | Webb | ............... | 123/559.1 |
| 2,882,884 A | * | 4/1959 | Scheiterlein | ............... | 123/54.6 |
| 3,142,996 A | * | 8/1964 | Anderson | ............... | 123/195 R |
| 3,295,193 A | * | 1/1967 | Maness | ............... | 29/220 |
| 3,382,854 A | * | 5/1968 | Steiner | ............... | 123/90.16 |
| 3,908,617 A | * | 9/1975 | Partridge | ............... | 123/195 C |
| 4,372,120 A | * | 2/1983 | Ford et al. | ............... | 60/605.1 |
| 4,537,173 A | * | 8/1985 | Norris | ............... | 123/592 |
| 4,817,566 A | | 4/1989 | Newman | ............... | 123/184.33 |
| 4,932,367 A | | 6/1990 | Newman et al. | ............... | 123/184.31 |
| 5,309,886 A | * | 5/1994 | Hitomi et al. | ............... | 60/605.2 |
| 5,365,900 A | * | 11/1994 | Farnlund et al. | ............... | 123/193.5 |

(Continued)

FOREIGN PATENT DOCUMENTS

DE      3743854 A1 * 7/1989

Primary Examiner—Thai Ba Trieu
(74) Attorney, Agent, or Firm—Julia Voutyras; Brooks Kushman P.C.

(57) ABSTRACT

A multiple cylinder internal combustion engine having an engine block with first and second cylinder banks arranged at an angle and longitudinally offset relative to one another and a camshaft disposed within the engine block for actuating valves associated with each cylinder includes first and second cylinder heads associated with the first and second cylinder banks and having an intake runner for each cylinder with an entrance disposed on an outward side, and an exhaust runner for each cylinder exiting the cylinder head on an inward side of the cylinder head generally rearward of an associated cylinder to facilitate positioning of one or more turbochargers and a fuel pump in the valley generally between the cylinder heads with the fuel pump disposed forward of the exhaust runner exits and associated exhaust manifolds while accommodating four valves per cylinder actuated by four pushrods extending through the cylinder heads forward of corresponding exhaust runner exits.

16 Claims, 3 Drawing Sheets

U.S. PATENT DOCUMENTS

| | | | |
|---|---|---|---|
| 5,429,086 A * | 7/1995 | Glackin | 123/308 |
| 5,443,050 A * | 8/1995 | Hitomi et al. | 123/90.15 |
| 5,497,734 A * | 3/1996 | Okada | 123/54.4 |
| 5,636,600 A | 6/1997 | Sweetland et al. | 123/90.4 |
| 5,669,326 A * | 9/1997 | Ikeda | 114/363 |
| 5,732,670 A * | 3/1998 | Mote, Sr. | 123/90.24 |
| 5,983,849 A * | 11/1999 | Wangen et al. | 123/90.61 |
| 6,009,849 A | 1/2000 | Yamamoto et al. | 123/298 |
| 6,152,097 A * | 11/2000 | Sputhe | 123/195 R |
| 6,164,251 A | 12/2000 | Nishimura et al. | 123/54.4 |
| 6,305,168 B1 * | 10/2001 | Furukawa | 123/53.6 |
| 6,321,532 B1 * | 11/2001 | Komush | 60/313 |
| 6,346,018 B1 * | 2/2002 | Watanabe | 123/195 P |
| 6,564,783 B2 * | 5/2003 | Chou et al. | 123/559.1 |
| 6,644,024 B1 * | 11/2003 | Powers et al. | 60/323 |
| 7,228,833 B2 * | 6/2007 | Klotz | 123/90.16 |
| 7,234,449 B2 * | 6/2007 | Casabianca et al. | 123/456 |
| 7,258,093 B2 * | 8/2007 | Chriswell et al. | 123/193.5 |
| 7,318,399 B2 * | 1/2008 | Methley | 123/90.16 |
| 7,458,350 B2 * | 12/2008 | Diggs | 123/90.16 |
| 2006/0196178 A1 * | 9/2006 | Caine et al. | 60/324 |
| 2006/0243250 A1 | 11/2006 | Fukui | 123/432 |
| 2007/0261680 A1 * | 11/2007 | Farell et al. | 123/556 |
| 2008/0047262 A1 * | 2/2008 | Chu | 60/323 |

* cited by examiner

PUSH ROD ENGINE WITH INBOARD EXHAUST

BACKGROUND

1. Technical Field

The present disclosure relates to a system and method for providing inboard exhaust in a V-type, pushrod or cam-in-block internal combustion engine.

2. Background Art

Engine compartments of automotive vehicles have grown increasingly crowded as more components are added to the engine to improve performance and reduce emissions. V-type turbocharged engines may include a pushrod valvetrain having the camshaft located in the engine block, and the turbocharger(s) located in the valley formed between the two cylinder heads to provide a compact engine package. However, conventional outboard exhaust manifolds require relatively long runners to route the exhaust to the turbocharger located in the valley. This increases the package size and increases heat rejection associated with greater exposed surface area resulting in higher underhood temperatures and longer catalytic converter light-off times. It is desirable for packaging considerations, turbocharger efficiency, and catalytic converter light-off times to reduce the complexity and length of the exhaust plumbing. Reduced package size generally improves heat retention and turbo boost and operating efficiency.

A central or inboard exhaust configuration may be used to reduce exhaust runner length to the turbocharger. This configuration has the exhaust ports of each cylinder bank directed inboard toward the valley of the engine. While such an arrangement significantly reduces the length of the exhaust runners, the exhaust must be routed around the pushrods and cylinder head bolts. In addition, the increased heat in the valley presents challenges with respect to the configuration of the water jacket for sufficient coolant flow to prevent oil coking and/or warping or cracking of the cylinder heads. Other heat-related and packaging considerations include positioning of the high-pressure fuel pump for common rail fuel injection systems.

SUMMARY

A multiple cylinder internal combustion engine having an engine block with first and second cylinder banks arranged at an angle and longitudinally offset relative to one another and a camshaft disposed within the engine block for actuating valves associated with each cylinder includes first and second cylinder heads associated with the first and second cylinder banks having an intake runner for each cylinder with an entrance disposed on an outward side, and an exhaust runner for each cylinder exiting the cylinder head on an inward side of the cylinder head generally rearward of an associated cylinder to facilitate positioning of one or more turbochargers and a fuel pump in the valley generally between the cylinder heads with the fuel pump disposed forward of the exhaust runner exits and associated exhaust manifolds while accommodating four valves per cylinder actuated by four pushrods extending through the cylinder heads forward of corresponding exhaust runner exits.

In one embodiment, a multiple cylinder internal combustion engine includes an engine block having first and second cylinder banks arranged at an angle and longitudinally offset relative to one another and a camshaft disposed within the engine block for actuating intake and exhaust valves via corresponding pushrods. A first cylinder head associated with the first cylinder bank includes an integrated intake plenum with an outboard intake and intake runners coupling the plenum from an outboard side to corresponding cylinder intake ports, and exhaust runners for each cylinder coupling exhaust ports of the cylinder to an exit for each cylinder disposed on an inboard side of the cylinder head generally rearward of a corresponding cylinder. A second cylinder head associated with the second cylinder bank includes an integrated intake plenum with an outboard intake and intake runners coupling the plenum from an outboard side to corresponding cylinder intake ports, and exhaust runners for each cylinder coupling exhaust ports of the cylinder to an exit for each cylinder disposed on an inboard side of the cylinder head generally rearward of the corresponding cylinder. At least one turbocharger is disposed in a valley located generally between the first and second cylinder heads and is connected to first and second exhaust manifolds coupling the inboard exhaust passages of each cylinder head to the turbocharger(s). A fuel pump is positioned in the valley forward of the exhaust manifolds and at least one turbocharger.

The present disclosure includes embodiments having various advantages. For example, embodiments of the present disclosure provide improved packaging by allowing the exhaust manifolds to be located in the valley with the turbocharger(s). This arrangement reduces the length of the exhaust-turbocharger connections resulting in better heat conservation and less heat transfer to outside peripherals such as the fuel pump, steering column, engine mounts, alternator, etc. Shorter exhaust-turbocharger connections of the present disclosure have reduced heat loss, which increases heat provided to the turbocharger(s) improving operation efficiency and transient response. Higher turbocharger outlet temperatures provide additional heat to any downstream emission control devices to improve catalyst light-off and start-up performance. In addition, less heat transfer to intake air may result in reduced feedgas emissions and improved fuel economy.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a turbocharged, four-stroke, multi-cylinder, direct-injected compression-ignition internal combustion engine. Those of ordinary skill in the art may recognize similar applications or implementations consistent with the present disclosure for other engine/vehicle technologies, including spark-ignition engines of various configurations, for example. As used herein, words of direction such as forward or rearward generally refer to the orientation of an engine mounted under the hood in the front portion of a passenger vehicle and are used for ease of illustration and description of representative embodiments. Those of ordinary skill in the art will recognize that the teachings of the present disclosure may be applied to other applications or implementations where the engine may be installed toward the rear of the vehicle or under a cab, for example, and that the words of direction should be adapted or modified accordingly for those applications consistent with the teachings herein.

Figure 1:
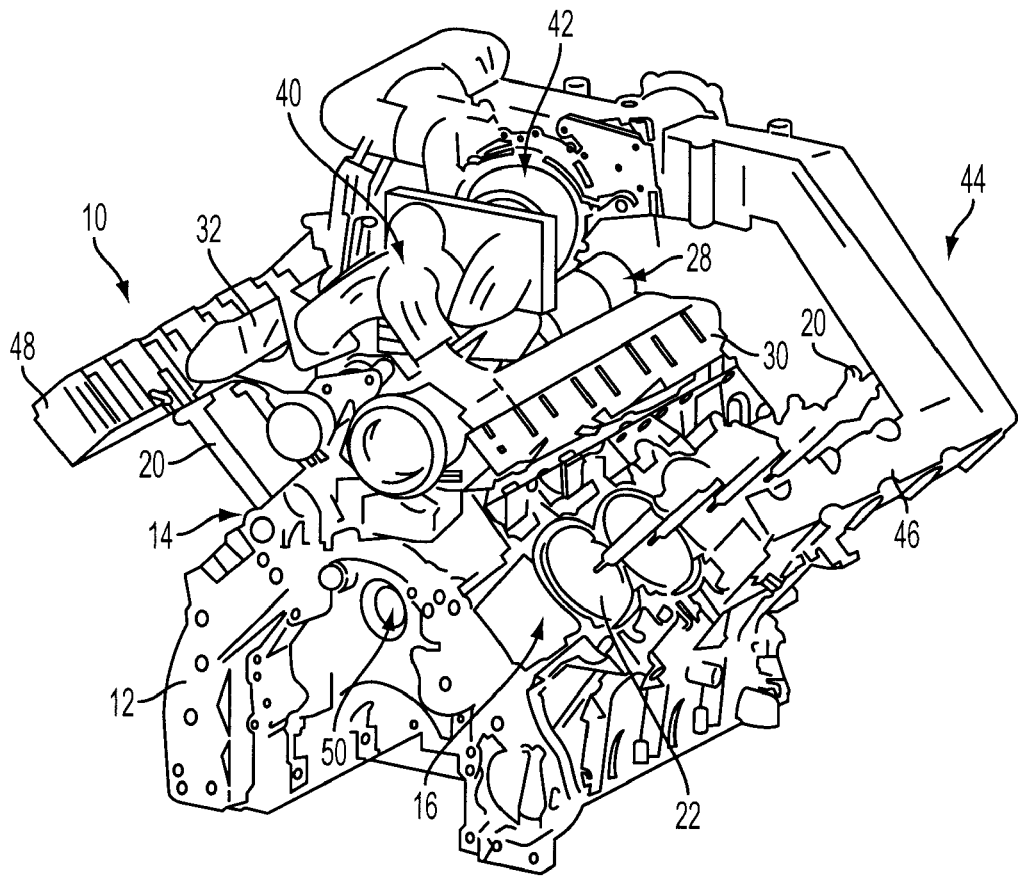
FIG. 1 is a perspective view illustrating components of an internal combustion pushrod engine with inboard exhaust according to one embodiment of the present disclosure.

Various components of a representative embodiment of a multiple cylinder internal combustion engine having an inboard exhaust system to reduce heat rejection according to one embodiment of the present disclosure are shown in the rear view of FIG. 1. Engine 10 includes an engine block 12 having a first cylinder bank 14 and a second cylinder bank 16 arranged at an angle relative to one another, typically referred to as a "V" configuration or "V"-type engine. The space disposed generally between cylinder banks 14, 16 is also known as the valley of the engine. Cylinder banks 14, 16 are longitudinally (forward/rearward) offset relative to one another by a distance known as the bank offset. While illustrated and described with respect to a V-type engine, the present disclosure is not necessarily limited to a particular cylinder bank configuration and those of ordinary skill in the art may recognize other engine configurations in which various features of the present disclosure may be used to advantage.

Engine 10 includes first and second cylinder heads (best shown in FIGS. 2-5) associated with corresponding cylinder banks 14, 16 that define the upper portion of cylinders 22 and contain various intake, exhaust, and cooling passages. The cylinder heads are not specifically illustrated in FIG. 1 so that other components, such as fuel injectors 20 may be readily identified. Each fuel injector 20 is secured within a respective cylinder head and extends into a respective cylinder 22 of engine block 12. Fuel injectors 20 associated with one of the cylinder banks 14, 16 may be connected to a corresponding common fuel rail 60 (FIG. 2) that delivers pressurized fuel from a fuel pump 28 disposed in the valley generally forward of exhaust manifolds 30, 32. Depending on the particular application and implementation, engine 10 may include more than one fuel pump 28. Both compression ignition, such as diesel-fueled engines, and spark ignition, such as gasoline-fueled engines, may use direct injection strategies where fuel is injected directly into the combustion chamber during operation. These systems often have an electric low-pressure fuel pump located in or near the fuel tank that provides fuel to a mechanical high-pressure fuel pump driven by rotation of the engine camshaft or crankshaft. In the embodiment of FIG. 1, fuel pump 28 is a high-pressure fuel pump advantageously positioned forward of exhaust manifolds 30, 32, which is facilitated by biasing exhaust passageways of the cylinder heads rearward as illustrated and described with reference to FIGS. 2-4. Positioning fuel pump 28 in the valley forward of exhaust manifolds 30, 32 allows fuel pump 28 to be mechanically driven by a gear connected to the camshaft while keeping ambient operating temperatures for fuel pump 28 within an acceptable range during engine operation.

Each exhaust manifold 30, 32 is disposed on the inboard side of an associated cylinder head and connects exhaust passages from cylinders 22 within a corresponding bank 14, 16 to the turbine of at least one turbocharger 40, 42 disposed in the valley of engine 10. The compressor of the at least one turbocharger 40, 42 is connected to an intake system 44 disposed generally on the outboard side of the cylinder banks 14, 16 and corresponding cylinder heads. Intake manifolds 46, 48 distribute intake air to each of the various cylinders 22 from the outboard side of engine 10. In an alternative embodiment illustrated and described with reference to FIGS. 2-5, the cylinder heads may include an integrated intake manifold or plenum, which is connected to intake system 44 at one point of the cylinder head and includes internal passages that distribute the intake air to the intake runners of various cylinders 22.

Figure 2:
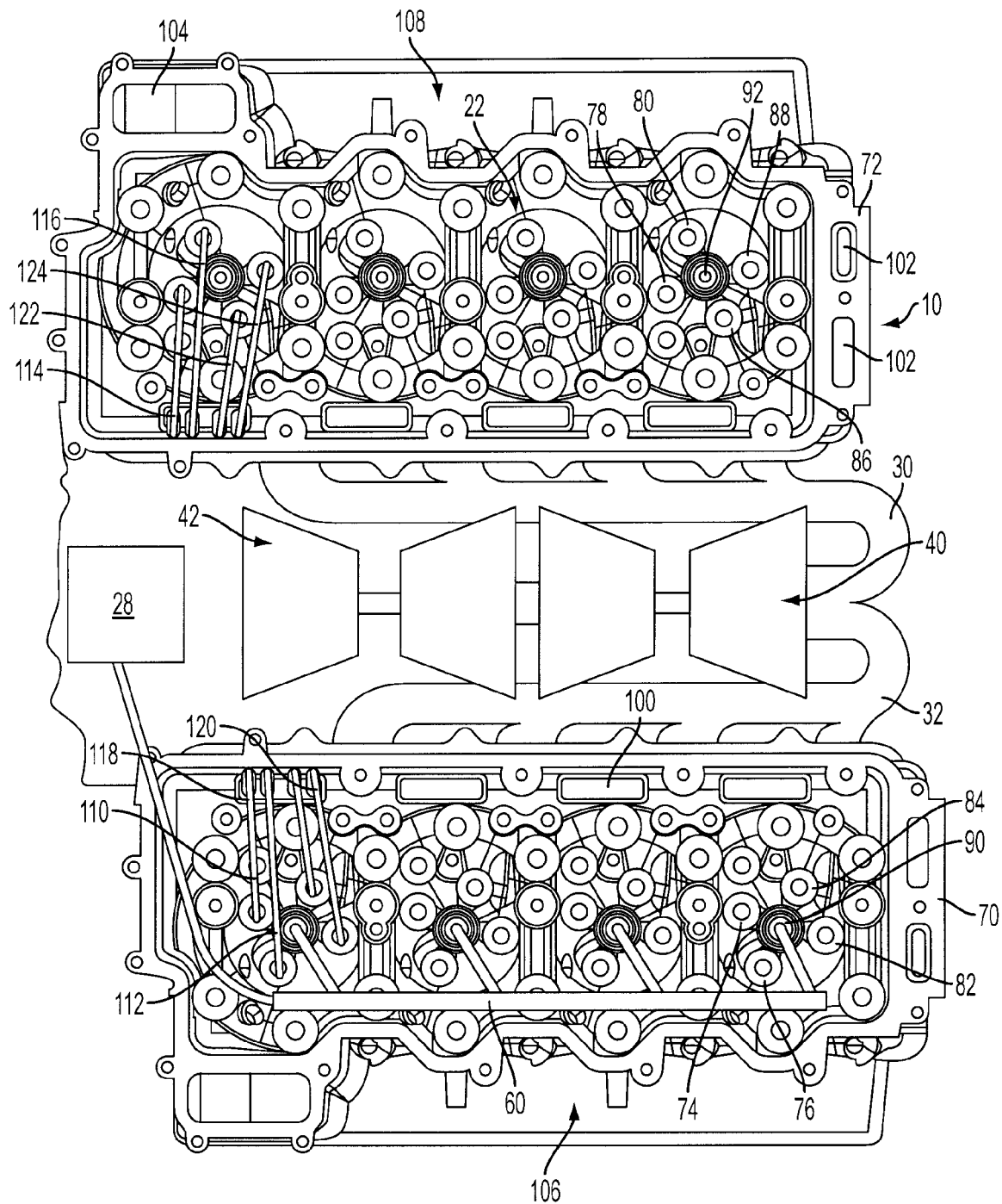
FIG. 2 is a top view illustrating orientation of cylinder heads with central or inboard exhaust relative to exhaust manifolds, outboard integrated intake plenums, turbocharger(s), and fuel pump(s) according to one embodiment of the present disclosure.
Figure 3:
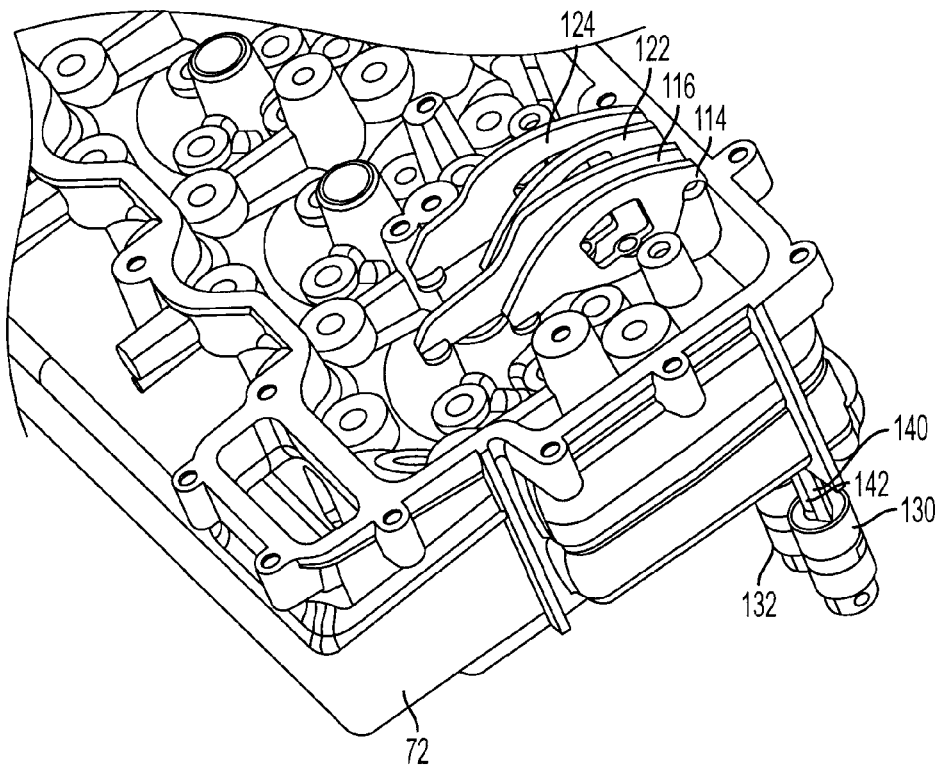
FIG. 3 is a perspective view illustrating valvetrain components for a cylinder head having inboard exhaust according to one embodiment of the present disclosure.
Figure 4:
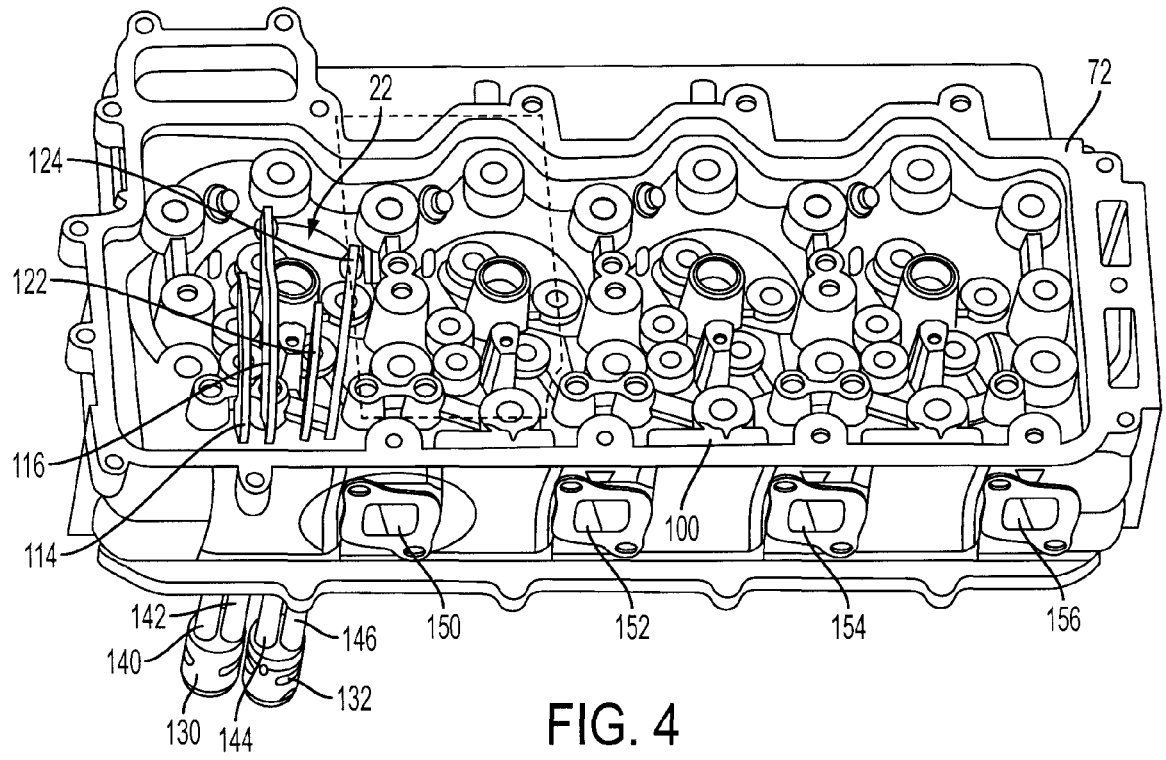
FIG. 4 is a perspective view illustrating inboard exhaust exits for a cylinder head according to one embodiment of the present disclosure.

Engine block 12 includes a bore 50 adapted to receive a camshaft used for actuating the intake/exhaust valves of the engine valvetrain via corresponding pushrods extending through the cylinder heads (FIGS. 2-4). As such, engine 10 is often referred to as a cam-in-block or pushrod engine. In the embodiment illustrated in FIG. 1, engine 10 is a V-8 engine with four cylinders 22 in each bank 14, 16 and four valves per cylinder, each with a separate or dedicated pushrod. As such, engine block 12 and the cylinder heads for banks 14, 16 accommodate a total of thirty-two pushrods that extend therethrough to actuate corresponding intake/exhaust valves. Of course, the teachings of the present disclosure may also be applied to more traditional engine implementations that utilize a single pushrod to actuate pairs of intake/exhaust valves.

Referring now to FIG. 2, a top view illustrating orientation of cylinder heads having central or inboard exhaust according to one embodiment of the present disclosure is shown. Cylinder heads 70, 72 are secured to corresponding cylinder banks 14, 16, (FIG. 1) respectively. Cylinder heads 70, 72 include intake valve stem bores 74, 76 and 78, 80 associated with each cylinder 22 and adapted to receive corresponding intake valve stems of the intake valves that control air intake into cylinders 22 from associated integrated intake manifolds or plenums 106, 108 during operation of engine 10. Integrated intake manifolds or plenums 106, 108 are disposed on the outboard side of cylinder heads 70, 72 to provide a cross-flow gas exchange strategy where intake air enters each cylinder 22 from one side and exits through exhaust ports on the opposite side of each cylinder 22.

Cylinder heads 70, 72 also include exhaust valve stem bores 82, 84 and 86, 88 associated with each cylinder 22 and adapted to receive corresponding exhaust valve stems of the exhaust valves that control exhaust gas exiting cylinders 22 during operation of engine 10. As such, cylinder heads 70, 72 accommodate four valves per cylinder including two intake valves that couple intake ports and associated intake runners to integrated intake manifolds 106, 108 and two exhaust valves that couple exhaust ports and associated exhaust runners or passageways to exhaust manifolds 32, 30. Each cylinder 22 also includes a central injector bore 90, 92 to accommodate a corresponding fuel injector 20 (FIG. 1) to inject fuel directly into each cylinder 22. Fuel is supplied to injectors associated with each cylinder head from a common fuel rail 60, only one of which is illustrated. Fuel rail 60 is generally positioned toward the outboard side of each cylinder head 70, 72.

As also shown in FIG. 2, cylinder heads 70, 72 include a pushrod slot 100 extending therethrough for each cylinder 22 that accommodates the pushrods 140, 142, 144, 146 (FIGS. 3-4) that cooperate with rocker arms 114, 116, 122, 124, respectively to actuate corresponding intake/exhaust valves in response to rotation of the camshaft disposed within engine block 12 (FIG. 1). Cylinder heads 70, 72 also include one or more coolant inlets 102 and outlets 104 connected by various internal passages that define a water jacket surrounding cylinders 22 to provide cooling during operation of engine 10. The water jacket was designed to route coolant around pushrod slots 100 while providing sufficient coolant velocities surrounding the exhaust ports and runners that connect cylinders 22 to inboard exhaust manifolds 30, 32 to dissipate heat during engine operation to avoid warping or cracking of cylinder heads 70, 72 and to avoid degradation and/or coking of lubricating oil in contact with surfaces above cylinders 22 and the exhaust passages.

In the embodiment illustrated in FIG. 2, packaging considerations and compromises related to routing of the water jacket to provide sufficient cooling, actuating four valves per cylinder from a common camshaft with separate pushrods extending through the cylinder head to accommodate independent lash adjustment, and biasing inboard exhaust passages away from the high-pressure fuel pump to provide acceptable operating temperatures and mechanically drive the pump with a camshaft gear, among other considerations, resulted in a design in which cylinder banks 14, 16 are longitudinally offset a distance different from the longitudinal offset of the lifter bores and pushrod slots 100. As such, the valvetrain includes a first plurality of rocker arms 110, 112, 118, 120 associated with each cylinder 22 of cylinder head 70 having a first geometry and a second plurality of rocker arms 114, 116, 122, 124 for each cylinder 22 associated with cylinder head 72 having a second geometry different from the first plurality of cylinder heads. As such, a two-bank engine with four valves per cylinder and dedicated pushrod for each actuation of each valve has eight different rocker arm geometries. This more complex valvetrain does not significantly impact cost when using single plane stamped steel rocker arms as disclosed in commonly owned and copending Published U.S. Application No. US2007/0119397 and U.S. patent application Ser. No. 11/308,021 filed Mar. 3, 2006, the disclosures of which are incorporated by reference in their entirety.

FIGS. 3 and 4 provide alternate perspective views of cylinder head embodiments having inboard exhaust according to the present disclosure. FIG. 3 is a front perspective view of cylinder head 72 while FIG. 4 is an inboard-side perspective view of cylinder head 72. A first lifter 130 contacts a corresponding lobe of the camshaft disposed within the engine block 12 (FIG. 1) to actuate all the intake valves associated with a particular cylinder 22 via associated pushrods 140, 142 and rocker arms 114, 116, respectively. Similarly, a second lifter 132 contacts a corresponding lobe of the camshaft to actuate all the exhaust valves associated with a particular cylinder 22 via associated pushrods 144, 146 and rocker arms 122, 124, respectively. As illustrated in FIGS. 3 and 4, each lifter 130, 132 may be coupled to a plurality of pushrods and may include independently operable lash adjustment mechanisms for each pushrod. Alternatively, each lifter may be coupled to a single pushrod in a bridged configuration to operate multiple intake and/or multiple exhaust valves associated with a particular cylinder as well known in the art.

Cylinder head 72 includes internal exhaust openings or ports for each cylinder 22 that are connected to corresponding exhaust runners or passageways that connect the cylinder to a corresponding inboard exhaust exit 150. In the embodiment illustrated in FIGS. 3 and 4, each cylinder 22 includes two exhaust ports that are combined in an exhaust runner within cylinder head 72 that exits cylinder 72 on the inboard side at 150 generally rearward of its corresponding cylinder 22 and rearward of the corresponding pushrod slot 100. As such, cylinder head 72 includes four corresponding exhaust exits 150, 152, 154, and 156 that are each biased rearward relative to their respective cylinders. Exhaust exits 150, 152, 154, and 156 are coupled to a corresponding inboard exhaust manifold 30 (FIG. 2), which delivers the exhaust gases to at the turbine of at least one turbocharger 40, 42 (FIG. 2) disposed within the valley of engine 10.

Figure 5:
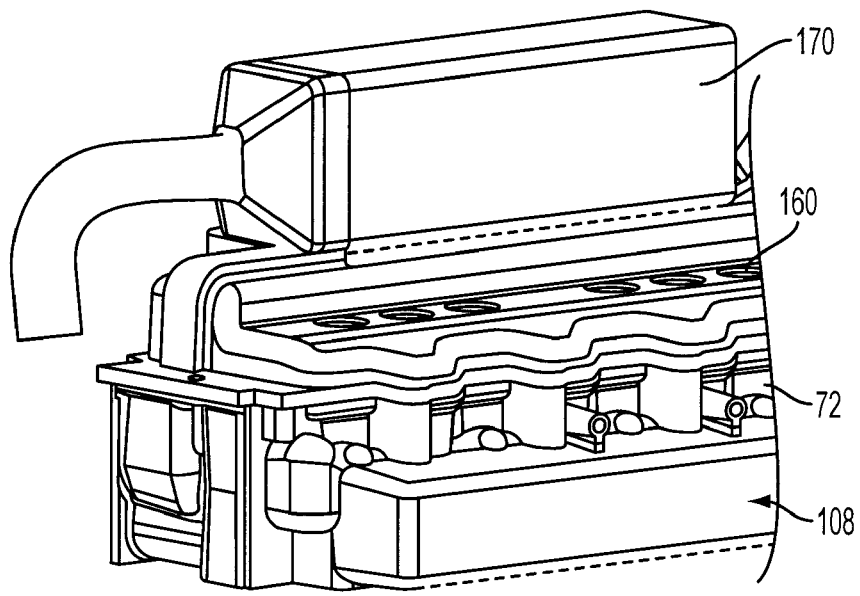
FIG. 5 is a perspective view illustrating the rocker cover and cooling water return for an engine having inboard exhaust according to one embodiment of the present invention.

FIG. 5 is a perspective view of cylinder head 72 from the outboard side illustrating integrated intake manifold plenum 108. A rocker cover 160 extends over the rocker arms and is secured to cylinder head 72 to keep lubricating oil contained within the engine. Similarly, a coolant return 170 routes coolant or water from the cooling passages forming the water jacket of cylinder head 72 to the vehicle radiator.

As illustrated and described herein, embodiments of the present disclosure provide improved packaging for a V-type cam-in-block or pushrod engine by biasing exhaust passages toward the rear of the cylinders, which allows the exhaust manifolds to be located in the valley with one or more turbochargers. This arrangement reduces the length of the exhaust-turbocharger connections resulting in better heat conservation and less heat transfer to outside peripherals such as the fuel pump, steering column, engine mounts, alternator, etc. Shorter exhaust-turbocharger connections according to the present disclosure generally have reduced heat loss, which increases heat provided to the turbocharger(s) thereby improving operation efficiency and transient response. Higher turbocharger outlet temperatures provide additional heat to any downstream emission control devices to improve catalyst light-off and start-up performance. In addition, less heat transfer to intake air may result in reduced feedgas emissions and improved fuel economy.

While the best mode has been described in detail, those familiar with the art will recognize various alternative designs and embodiments within the scope of the following claims. One or more embodiments have been described as providing advantages or being preferred over other embodiments and/or over prior art in regard to one or more desired characteristics. However, as one skilled in the art is aware, compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the invention as claimed.

What is claimed:

1. An engine comprising:
   first and second cylinder heads longitudinally offset relative to one another with pushrod slots for each cylinder accommodating all pushrods for a respective cylinder and disposed on inward sides of the cylinder heads forward of corresponding exhaust runner exits, the cylinder heads associated with respective with intake runners disposed on an outward side, and exhaust runners exiting the cylinder head on an inward side of generally rearward of an associated cylinder.

2. The engine of claim 1 wherein each of the exhaust runners connects at least two exhaust ports from each cylinder.

3. The engine of claim 1 wherein the pushrod slots of the first cylinder head are longitudinally offset relative to the pushrod slots of the second cylinder head a distance different from the longitudinal offset between the first and second cylinder banks.

4. The engine of claim 1 further comprising at least one turbocharger disposed between the first and second cylinder heads and coupled to the exhaust runner exits of the first and second cylinder heads.

5. The engine of claim 4 further comprising:
a first exhaust manifold disposed on the inward side of the first cylinder head and coupled to the exhaust runner exits of the first cylinder head and to the at least one turbocharger; and
a second exhaust manifold disposed on the inward side of the second cylinder head and coupled to the exhaust runner exits of the second cylinder head and to the at least one turbocharger.

6. The engine of claim 5 further comprising a fuel pump disposed between the first and second cylinder heads forward of the first and second exhaust manifolds.

7. A multiple cylinder internal combustion engine comprising:
an engine block having first and second cylinder banks arranged in a V configuration forming a valley therebetween;
a valvetrain having a camshaft disposed within the engine block for actuating intake and exhaust valves via corresponding pushrods;
at least one turbocharger disposed within the valley;
first and second cylinder heads each associated with a respective one of the cylinder banks, each cylinder head having an associated intake manifold disposed on an outboard side of the engine for distributing intake air to all the cylinders within a corresponding one of the cylinder banks, and an exhaust passage for each cylinder connecting exhaust ports of an associated cylinder and extending to an inboard side of the cylinder head; and
an exhaust manifold for each cylinder head disposed on the inboard side of each cylinder head and connecting exhaust passages of an associated cylinder bank to the at least one turbocharger disposed within the valley, wherein the valvetrain comprises a first plurality of rocker arms associated with the first cylinder bank and a second plurality of rocker arms associated with the second cylinder bank, the second plurality of rocker arms each having geometries different from any rocker arms in the first plurality of rocker arms.

8. The engine of claim 7 wherein each exhaust passage exits the cylinder head generally rearward of its associated cylinder.

9. The engine of claim 7 further comprising a fuel pump disposed within the valley generally forward of all the exhaust passages.

10. The engine of claim 7 wherein the first and second cylinder heads each include an integrated intake manifold for distributing intake air to all intake ports within the cylinder head.

11. The engine of claim 7 wherein the valvetrain comprises at least one pushrod per intake valve and one pushrod per exhaust valve.

12. The engine of claim 7 wherein the first and second cylinder heads each include a slot extending therethrough for each cylinder and disposed forward relative to the exhaust passage for the cylinder, the slot accommodating a plurality of pushrods for actuating intake/exhaust valves associated with the cylinder in response to rotation of the camshaft.

13. The engine of claim 12 wherein each slot accommodates four pushrods.

14. The engine of claim 12 wherein the first cylinder head includes cylinders that are longitudinally offset a first distance relative to cylinders of the second cylinder head and wherein the slots of the first cylinder head are longitudinally offset a second distance relative to the slots of the second cylinder head.

15. A multiple cylinder internal combustion engine comprising:
an engine block having first and second cylinder banks arranged at an angle and longitudinally offset relative to one another;
a camshaft disposed within the engine block for actuating intake and exhaust valves via corresponding pushrods;
a first cylinder head associated with the first cylinder bank, the first cylinder head having an integrated intake plenum with an outboard intake and intake runners coupling the plenum from an outboard side to corresponding cylinders and exhaust runners for each cylinder coupling exhaust ports of the cylinder to an exit for each cylinder disposed on an inboard side of the cylinder head generally rearward of a corresponding cylinder;
a second cylinder head associated with the second cylinder bank, the second cylinder head having an integrated intake plenum with an outboard intake and intake runners coupling the plenum from an outboard side to corresponding cylinders, and exhaust runners for each cylinder coupling exhaust ports of the cylinder to an exit for each cylinder disposed on an inboard side of the cylinder head generally rearward of a corresponding cylinder;
a turbocharger disposed generally between the first and second cylinder heads;
a first exhaust manifold disposed inboard of the first cylinder head and coupling the exhaust exit of each cylinder of the first cylinder head to the turbocharger;
a second exhaust manifold disposed inboard of the second cylinder head and coupling the exhaust exit of each cylinder of the second cylinder head to the turbocharger; and
a valvetrain having a plurality of lifters for each cylinder and a plurality of pushrods for each lifter wherein each lifter actuates all intake valves or all exhaust valves associated with a particular cylinder using the plurality of pushrods associated with the lifter, each valve actuated with a corresponding rocker arm, wherein the first and second cylinder heads each include bores adapted to receive four valves per cylinder and wherein each lifter actuates two pushrods and associated valves.

16. The engine of claim 15 further comprising a fuel pump disposed between the first and second cylinder banks forward of the first and second exhaust manifolds.

* * * * *